United States Patent
Yahashi

(10) Patent No.: US 6,847,360 B2
(45) Date of Patent: Jan. 25, 2005

(54) THREE-DIMENSIONAL MEASURING METHOD AND SYSTEM

(75) Inventor: Akira Yahashi, Kobe (JP)

(73) Assignee: Minolta Co., Ltd., Osaka (JP)

( * ) Notice: Subject to any disclaimer, the term of this patent is extended or adjusted under 35 U.S.C. 154(b) by 314 days.

(21) Appl. No.: 10/059,379

(22) Filed: Jan. 31, 2002

(65) Prior Publication Data

US 2002/0118274 A1 Aug. 29, 2002

(30) Foreign Application Priority Data

Jan. 31, 2001 (JP) .................................. 2001-022796

(51) Int. Cl.[7] .............................................. G06T 15/00
(52) U.S. Cl. ...................................................... 345/419
(58) Field of Search .............................. 345/419, 473, 345/474; 356/389, 375, 482, 498; 396/52–55; 348/208, 46; 382/106, 107, 154, 321, 131, 103, 236; 702/175, 193, 149, 150, 151, 153

(56) References Cited

U.S. PATENT DOCUMENTS

| | | | | |
|---|---|---|---|---|
| 4,673,276 A | * | 6/1987 | Yoshida et al. ................ 396/54 |
| 5,576,788 A | | 11/1996 | Miyazawa et al. | |
| 5,606,174 A | * | 2/1997 | Yoshimura et al. ..... 250/559.22 |
| 5,764,786 A | * | 6/1998 | Kuwashima et al. ......... 382/107 |
| 6,192,322 B1 | * | 2/2001 | Rafanelli et al. ............ 702/150 |
| 6,198,485 B1 | * | 3/2001 | Mack et al. ................. 345/419 |
| 6,297,881 B1 | | 10/2001 | Yahashi et al. | |
| 6,466,892 B2 | * | 10/2002 | Fujii et al. .................... 702/150 |
| 6,675,040 B1 | * | 1/2004 | Cosman ....................... 600/427 |

FOREIGN PATENT DOCUMENTS

| | | |
|---|---|---|
| JP | 6-138531 | 5/1994 |
| JP | 8-43721 | 2/1996 |

* cited by examiner

Primary Examiner—Mark Zimmerman
Assistant Examiner—Enrique L Santiago
(74) Attorney, Agent, or Firm—Burns, Doane, Swecker & Mathis, L.L.P.

(57) ABSTRACT

A three-dimensional measuring method comprising the following steps of: carrying out plural-time measurements with respect to a point on an object along the same line of vision using a three-dimensional measuring device; acquiring distance information on a distance between the point on the object and the three-dimensional measuring device for each measurement; determining a difference of the distance information of each point; making a decision such that the measurement is successful when the difference is smaller than a predetermined value; and making a decision such that the measurement is unsuccessful when the difference is larger than the predetermined value.

9 Claims, 11 Drawing Sheets

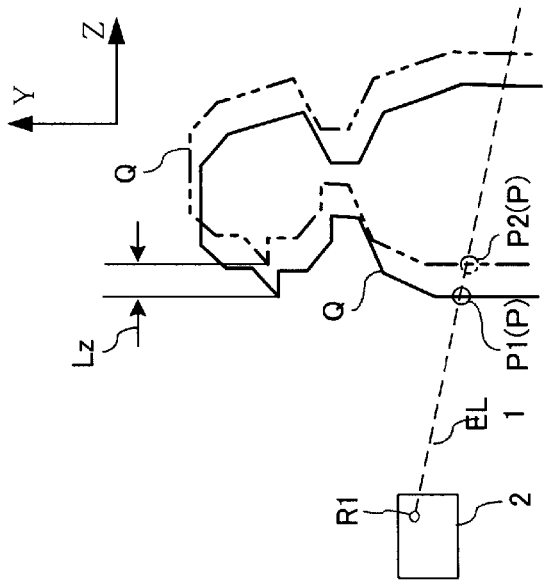
FIG.4A TOP PLAN VIEW
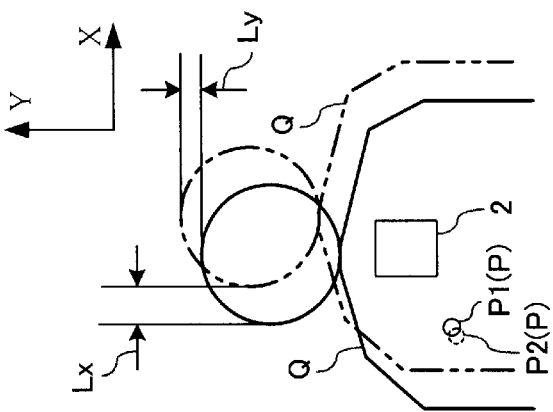
FIG.4B FRONT VIEW
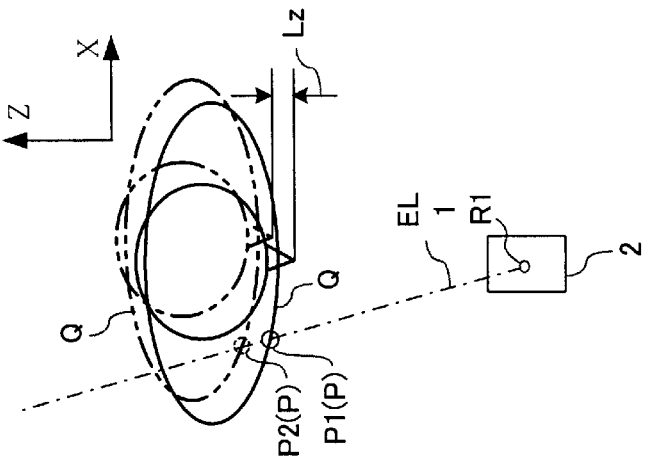
FIG.4C SIDE VIEW

THREE-DIMENSIONAL MEASURING METHOD AND SYSTEM

This application is based on Japanese Patent Application No. 2001-022796 filed on Jan. 31, 2001, the contents of which are hereby incorporated by reference.

BACKGROUND OF THE INVENTION

1. Field of the Invention

The present invention relates to a three dimensional measuring method and system.

2. Description of the Prior Art

Conventionally, the technique has been known, which detects a shaking or movement of camera and corrects a blur of image for obtaining a two-dimensional image. According to the above technique, camera shake or movement is detected by, for example, an angular accelerometer.

By the way, in general, three-dimensional measurement requires a long time to measure as compared with the pick-up of a two-dimensional image. For example, the pick-up of a two-dimensional image is performed at about one several tenth of a second; on the contrary, the three-dimensional measurement requires a longer time, that is, about one to several seconds. Therefore, in the three-dimensional measurement, shake or movement of a camera (three-dimensional measuring device) and movement of an object to be measured are serious problems as compared with the pick-up of a two-dimensional image.

In the three-dimensional measurement, the measurement is usually carried out in a state that a camera is fixed; therefore, there is no problem relative to camera shake or movement. On the contrary, in the case where there is a possibility that an object to be measured moves during measurement, less problem arises in the pick-up of a two-dimensional image; however, a serious problem is caused in the three-dimensional measurement.

More specifically, in the case of carrying out three-dimensional measurement of an object having the possibility of movement, for example, human, even if the three-dimensional measuring device is fixed, there is the case where the human moves during measurement. In this case, it is impossible to correctly measure parts moving during measurement. Nevertheless, in the conventional case, it has not been carried out to quantitatively sense whether the object moves during measurement.

Therefore, it is difficult to make a decision whether measured data is correct when the object does not move or is incorrect when it has moved; as a result, a person dealing with measurement subjectively has judged success or failure of measurement.

There is a method of carrying out three-dimensional measurement at high speed, that is, at a short time of about $1/125$ second. However, in such a high-speed three-dimensional measuring device, a measuring resolution is insufficient, the structure is complicated, and the device is oversized; for this reason, the device is very expensive.

SUMMARY OF THE INVENTION

The present invention has been made in view of the above problems in the prior art. Accordingly, an object of the present invention is to provide a three-dimensional measuring method and system for accurately measuring an object having the possibility of movement during measurement, such as human.

According to one aspect of the present invention, a three-dimensional measuring method comprises the steps of carrying out plural-time measurements with respect to a point on the object along the same line of vision using a three-dimensional measuring device, acquiring distance information on a distance between the point on the object and the three-dimensional measuring device for each measurement, determining a difference of the distance information of each point, making a decision such that the measurement is successful when the difference is smaller than a predetermined value, and making a decision such that the measurement is unsuccessful when the difference is larger than the predetermined value.

According to another aspect of the present invention, a three-dimensional measuring system comprises a measuring device for measuring a three-dimensional shape of an object, a movement detecting device for making a detection whether or not an object to be measured moves during measurement, and an output device for outputting a signal when a detection is made such that the object to be measured moves, the signal indicating the detection of the movement.

In the above method, the distance information includes various data corresponding to the distance in addition to data showing actual distance. For example, the distance information may be non-processed data for determining a distance to the point on the object. Further, the distance information may be data obtained by converting a distance value.

The features and advantages of the present invention will be more apparent from the following drawings and description.

BRIEF DESCRIPTION OF THE DRAWINGS

FIGS. 4A–4C are views showing a state that an object Q moves during measurement: FIG. 4A is a top plan view of the object Q; FIG. 4B is a front view of the object Q; and FIG. 4C is a side view of the object Q.

DESCRIPTION OF THE PREFERRED EMBODIMENTS

[First Embodiment]

This first embodiment describes the case where an object Q to be measured is human. Three-dimensional measurement is carried out twice, and then, based on the data obtained from the twice measurements, a movement during measurement is detected, and thereafter, a decision is made whether or not the measurement is successful.

Figure 1:
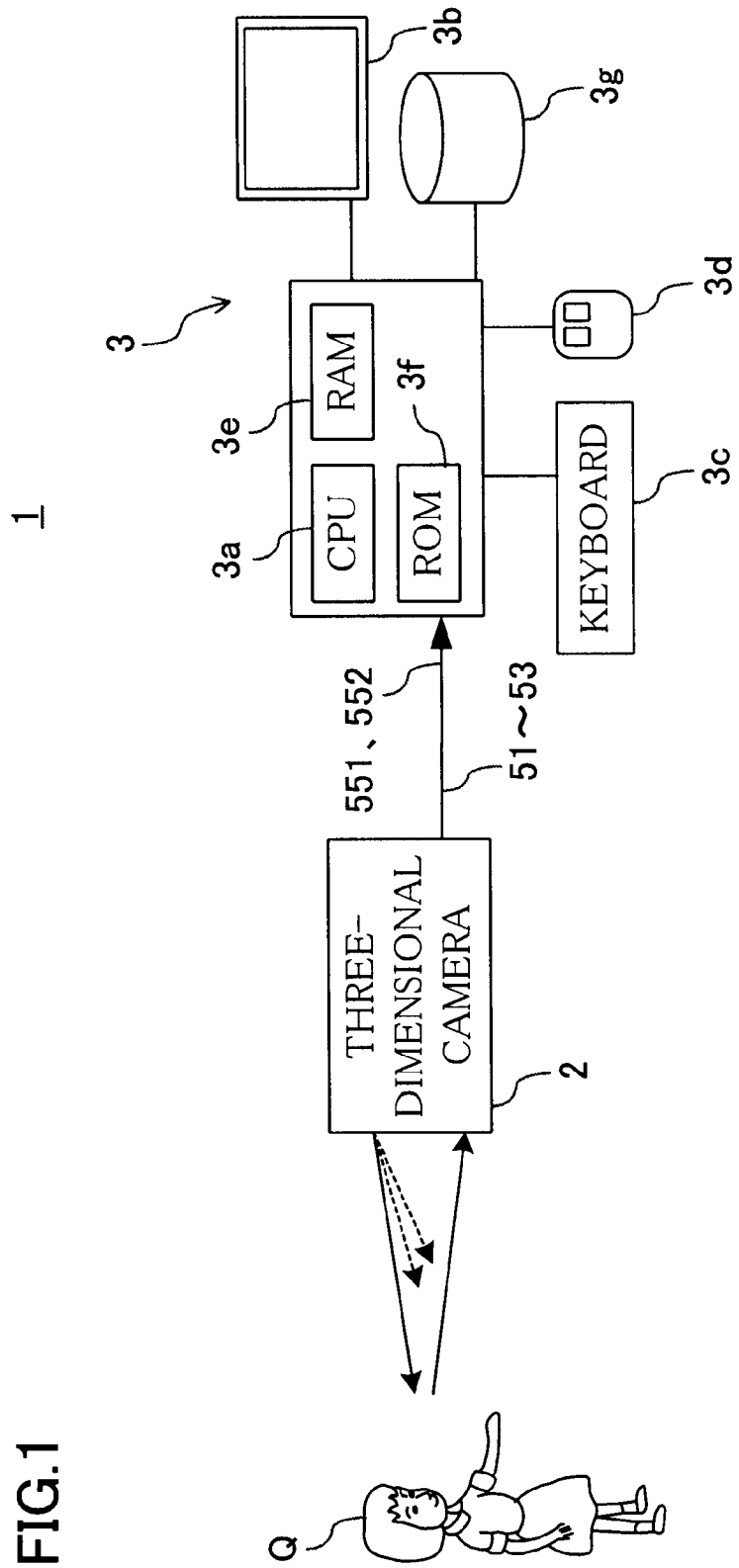
FIG. 1 is a view showing a configuration of a three-dimensional measuring system according to a first embodiment of the present invention.

As shown in FIG. 1, a three-dimensional measuring system 1 includes a three-dimensional data camera (hereinafter, referred to as "3D camera") 2, and a computer for processing output data of the 3D camera 2. The computer 3 and the 3D camera 2 are connected by cable or wireless line. In this case, the 3D camera 2 is a camera, which takes a picture for obtaining three-dimensional shape data of an object. The 3D camera 2 used in this embodiment performs three-dimensional measurement of the object Q by a light-stripe projection method.

More specifically, the 3D camera 2 outputs measurement data 51 for specifying a three-dimensional position of sampling point on the object Q, a two-dimensional image 52 showing color image information of the object Q, and data 53 required for calibration to the computer 3. In this case, the measurement data 51 is information (distance information) on a distance of each point on the object Q, and a distance image 54 is obtained from the measurement data 51.

A 3D camera disclosed in U.S. Pat. No. 6,297,881 is used as the 3D camera 2 mentioned above. The 3D camera uses an anamorphic lens; however, an ordinary lens may be used. In this case, the lens has a ratio of angle of view, which is one to one in vertical and horizontal directions. In addition, "VIVID700" manufactured by Minolta Co., Ltd. may be used as the 3D camera 2.

The computer 3 includes a CPU 3a, a display 3b, a keyboard 3c, a mouse 3d, a RAM 3e, a ROM 3f and a magnetic storage 3g. Software for realizing each function described later is installed on the ROM 3f or the magnetic storage 3g. The software is read in the RAM 3e as the need arises, and then, is executed by the CPU 3a.

Figure 2:
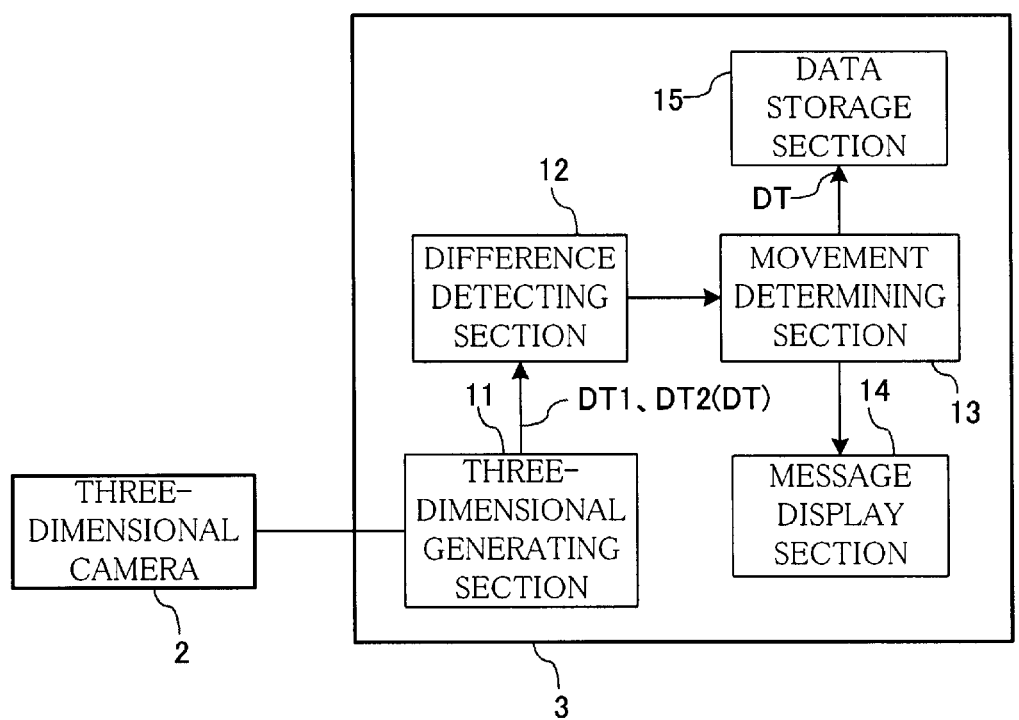
FIG. 2 is a view showing a functional configuration of computer according to the first embodiment of the present invention.

As shown in FIG. 2, by the configuration described above, the computer 3 is functionally provided with a three-dimensional generating section 11, a difference detecting section 12, a movement determining section 13, a message display section 14 and a data storage section 15, etc.

The three-dimensional generating section 11 calculates a three-dimensional position coordinate of each point P on the object Q based on the measurement data 51 obtained by the 3D camera 2, and then, generates three-dimensional shape data DT of the object Q. The three-dimensional shape data DT is generated in the following manner.

More specifically, as shown in FIG. 4A to FIG. 4C and FIG. 11A to FIG. 11C, a visual direction is obtained by an angle of view of light receiving lens of the 3D camera 2 and an object distance. In this case, the visual direction is a direction viewed from each pixel R of pickup surface (light receiving surface) S of a photoelectric transfer device such as a charge coupled device for acquiring distance information of a light receiving system. For each pixel R, a three-dimensional position coordinate of point P intersecting the visual direction and the surface of the object Q is calculated, and thereby, three-dimensional shape data DT is obtained.

Figure 11A:
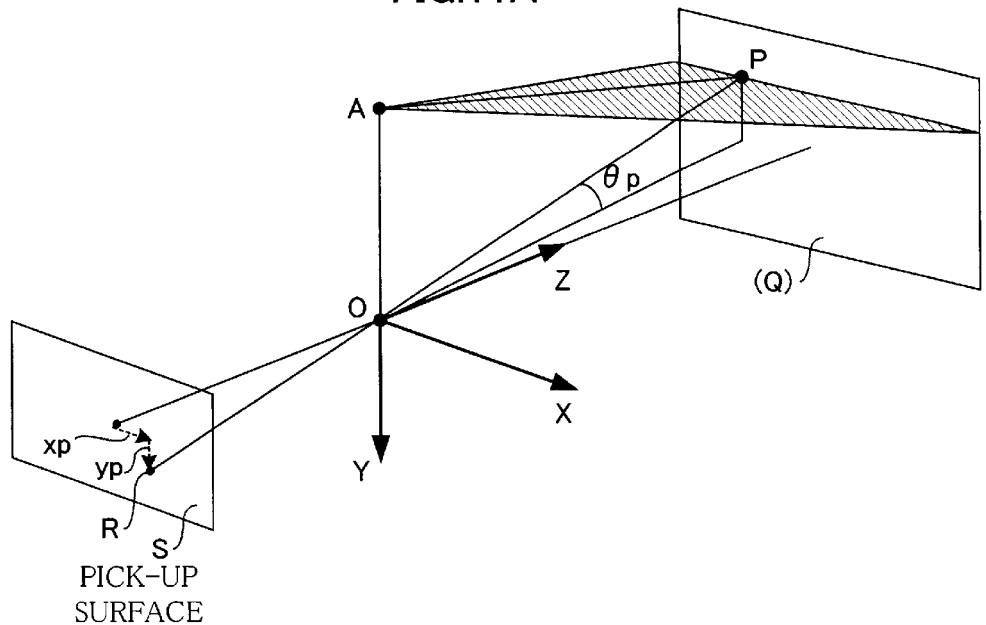
FIG. 11A to FIG. 11C are views to explain the principle of three-dimensional measurement.
Figure 11B:
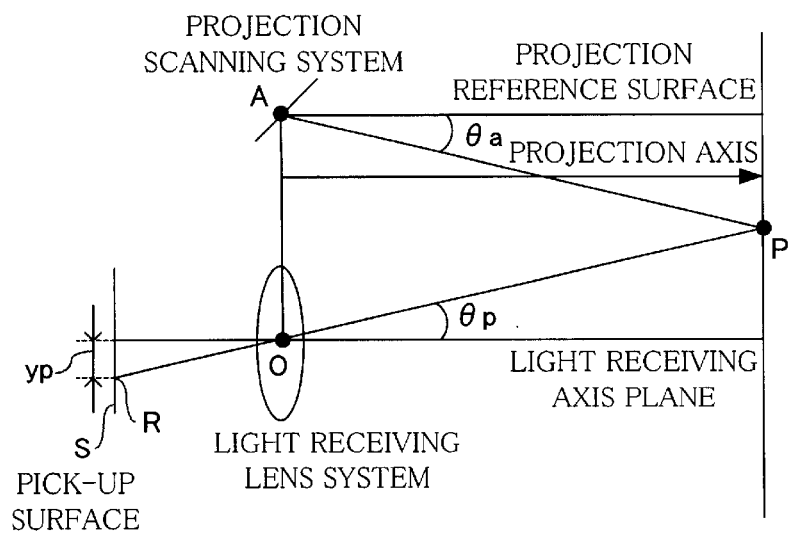
Figure 11C:
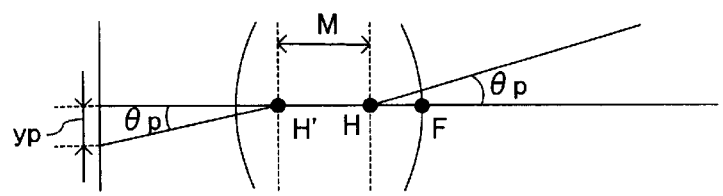

As shown in FIG. 11A to FIG. 11C, in the ordinary 3D camera, a projection system and a light receiving system are arranged so that a base AO connecting an initial point A of projection with a principal point O of lens of the light receiving system is vertical to a light receiving axis. The light receiving axis is vertical to the pick-up surface S. As shown in FIG. 11C, in the case where the light receiving system is provided with a zoom lens group, the principal point O is set as a rear principal point H'.

In the three-dimensional measurement based on the light-stripe projection method, a three-dimensional position of the point P on the object to be measured is determined based on a relation between an irradiation direction of reference beam from the 3D camera 2, that is, a projection angle $\theta a$ and an incident direction to the 3D camera 2, that is, a light receiving angle $\theta p$.

The projection angle $\theta a$ is determined based on a deflection angle of stripe light beam U. A change of the deflection angle is determined based on an angular velocity and an elapsed time. Therefore, a deflection angle at an arbitrary time of the beam U is determined based on the deflection angle at the time of starting deflection (original position), angular velocity, and an elapsed time from the start of deflection (measurement timing). These physical parameters can be obtained from a driving signal or a position signal of a scanning device, a clock signal for control, a sampling signal for measurement, an internal clock or the like. The light receiving angle $\theta p$ is determined based on a light receiving position (yp) on the pick-up surface S.

Figure 3:
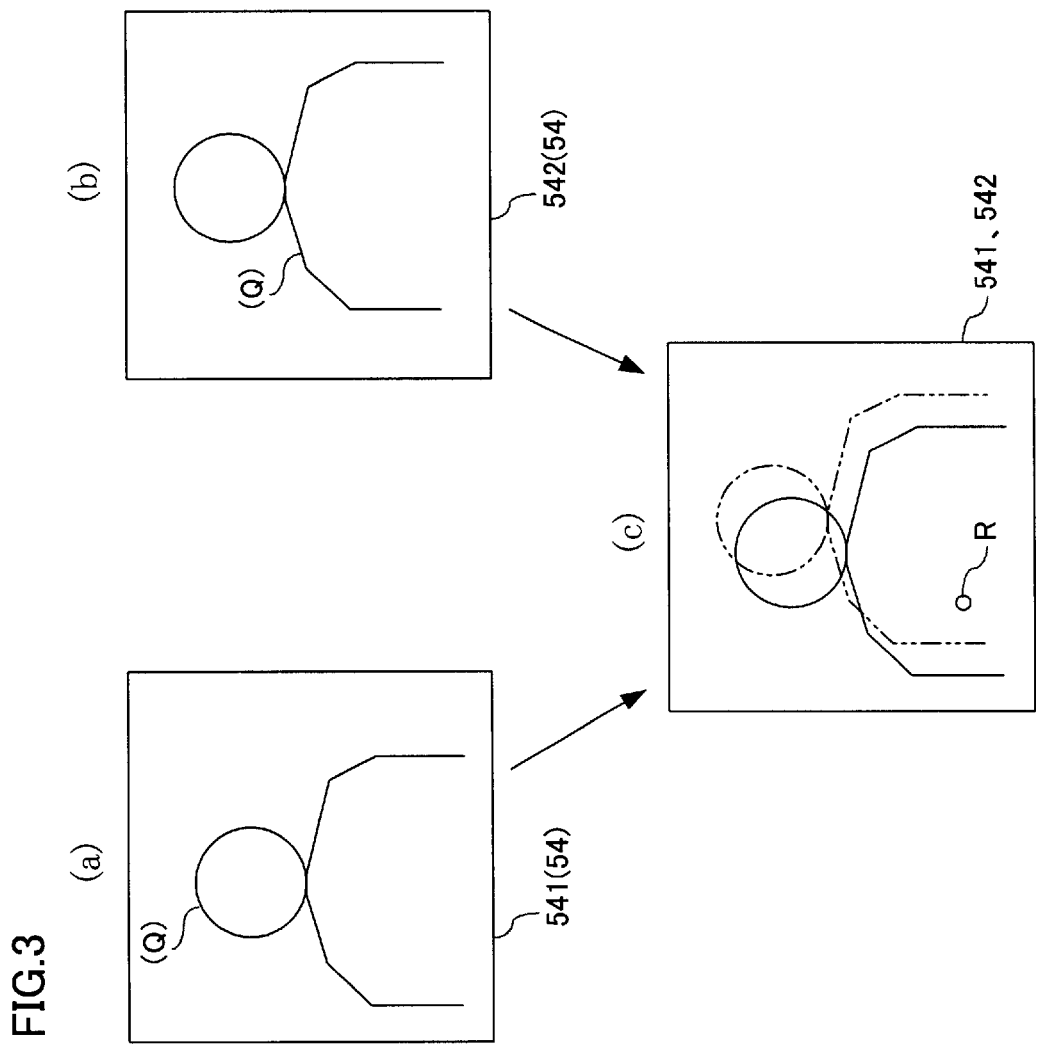
FIG. 3 is a view showing a distance image.

In the manner as described above, the measurement data 51 relative to each point P on the surface of the object Q is obtained. A distance image 54 as shown in FIG. 3 is obtained from the measurement data 51.

The measurement by the 3D camera 2 is carried out twice with respect to the object Q. By the first measurement, a distance image 541 as shown in (a) of FIG. 3 is obtained, and then, by the second measurement, a distance image 542 as shown in (b) of FIG. 3 is obtained.

During measurement, in the case where the object Q moves, it seems that a difference is generated in the twice measurement results. Therefore, in this case (the case where the object Q moves during measurement), when the distance images 541 and 542 obtained by each measurement is overlapped, a difference appears as shown in FIG. 3(c).

In FIG. 4A to FIG. 4C, a camera coordinate system (X, Y, Z) of the 3D camera 2 is defined as shown therein. In the camera coordinate system, an axis extending along the central position in a measuring range from the 3D camera 2 (light receiving axis) is set as a Z-axis. Namely, the Z-axis generally corresponds to a depth or distance direction in measuring the object Q. Further, axes perpendicular to the Z-axis and perpendicular to each other are set as an X-axis and a Y-axis. Usually, the X-axis extends along a horizontal direction; on the other hand, the Y-axis extends along a vertical direction. In other words, the X-axis indicates the right and left direction of the object Q; on the other hand, the Y-axis indicates a height direction of the object Q.

In FIG. 4A to FIG. 4C, a solid line shows a position of the object Q when measuring a certain portion of the object Q in the first measurement. Further, a chain line shows a position of the object Q when measuring a certain portion of the object Q from the same direction as the first measurement in the second measurement.

For example, the object Q moves during twice measurements by a certain distance, that is, Lx to the X-axis direction, Ly to the Y-axis direction, and Lz to the Z-axis direction. Further, in this case, one pixel R1 of the light receiving surface (corresponding to the pick-up surface S of FIG. 11A to FIG. 1C) has been noted.

With respect to a line of vision EL1 corresponding to the pixel R1, a point P1 on the object Q is measured by the first measurement, and then, a point P2 on the object Q is measured by the second measurement. During the measurement, the 3D camera 2 is fixed; therefore, the line of vision EL1 has no change. Two points P1 and P2 obtained by the twice measurements have three-dimensional positions different from each other. Further, usually, two points P1 and P2 are mutually different points on the object Q.

Three-dimensional position coordinates P1 (Xp1, Yp1, Zp1) and P2 (Xp2, Yp2, Zp2) are determined with respect to the measured points P1 and P2, respectively.

In the manner as described above, the three-dimensional position coordinates of the points P1 and P2 are determined for each pixel R. Thus, it is possible to obtain three-dimensional shape data DT1 by the first measurement and three-dimensional shape data DT2 by the second measurement.

Based on the three-dimensional shape data DT1 and DT2 thus obtained, that is, based on the three-dimensional position coordinates of measured points P1 and P2, a difference ΔP between these two points is determined by the difference detecting section 12.

More specifically, the difference AP between these two points P1 and P2 is obtained from the following equation in a three-dimensional space.

$$(\Delta Px, \Delta Py, \Delta Pz) = (Xp1 - Xp2, Yp1 - Yp2, Zp1 - Zp2)$$

Namely, the difference detecting section 12 compares the three-dimensional shape data DT1 with DT2, and then, determines the difference ΔP between these data. Further, the difference ΔP is expressed by each difference (difference component) ΔPx, ΔPy and ΔPz in the X-axis, Y-axis and Z-axis directions.

The movement determining section 13 compares the difference ΔP with a predetermined value so as to detect the presence of a movement of the object Q during measurement, and thereafter, makes a decision whether or not the measurement is successful. If the difference ΔP is smaller than the predetermined value, no movement appears; therefore, a decision is made that the measurement is successful. On the other hand, if the difference ΔP is larger than the predetermined value, a movement appears; therefore, a decision is made that the measurement is unsuccessful.

In this case, the comparison between the difference ΔP and the predetermined value may be made with respect to only one axial direction. For example, as shown in FIG. 4C, in the case where the line of vision EL1 of the pixel R1 is slightly inclined to a light receiving axis LL, the difference ΔPz of the Z-axis direction becomes larger than the differences ΔPx and ΔPy of the X-axis direction and the Y-axis direction. Namely, the movement of the object Q is liable to appear in the difference ΔPz as compared with the differences ΔPx and ΔPy. Thus, a comparison is made with respect to only the difference ΔPz of the Z-axis direction, and thereby, the movement can be effectively detected.

A dispersion limit value ±ΔMAX of the 3D camera 2 may be used as a value for making a comparison with the difference ΔP (predetermined value). The dispersion limit value is a value showing a measurement error range of the 3D camera 2 when measuring a still object. Likewise, in this case, a comparison may be made with respect to only one axial direction. In the above-mentioned example case, a comparison may be made between the difference ΔPz of the Z-axis direction and a Z-axis component ΔZmax of the dispersion limit value ±ΔMAX. In this case, a depth (Z-axis direction) dispersion limit value ΔZmax may be used as a performance guarantee value of the 3D camera 2.

In the manner described above, the difference ΔP corresponding to each pixel R of the distance images 541 and 542 is compared with the predetermined value, and thereafter, a decision is made whether or not measurement is successful. For example, if one or several differences ΔP or a difference component is larger than the predetermined value, a decision is made such that measurement is unsuccessful. For example, in the case where the difference ΔPz (=|zp1−Zp2|) of the Z-axis direction is larger than the dispersion limit value ΔZmax, the object Q is regarded as moved; therefore, a decision may be made such that measurement is unsuccessful. Further, if the average of each difference ΔP is larger than the predetermined value, a decision may be made such that measurement is unsuccessful; on the other hand, if it is smaller than the predetermined value, a decision may be made such that measurement is successful. The decision is made considering movement of the object Q or features relative to a change in shape.

Figure 5:
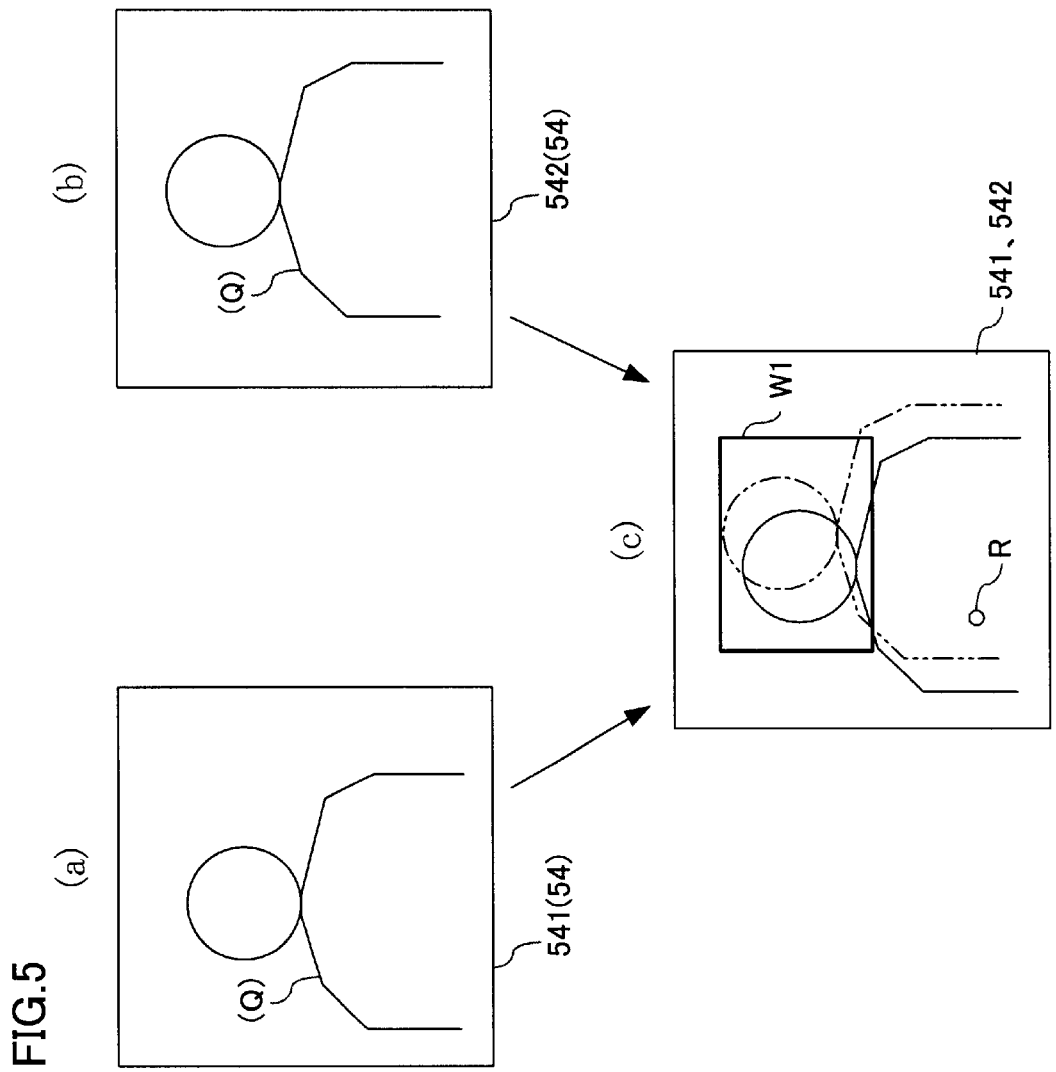
FIG. 5 is a view to explain the example of making a comparison relative to a part of the distance image.

In the above-mentioned embodiment, the comparison between the difference ΔP and the predetermined value is made with respect to the entire measuring range. However, the comparison between the difference ΔP and the predetermined value may be made with respect to a part of the distance images 541 and 542. For example, as shown in (c) of FIG. 5, a comparison may be made with respect to a face range W1 of the object Q. In the object Q, a portion to be measured precisely in particular, an important portion where it is disadvantageous to have a movement or a portion where the movement easily occurs may be selected as the range W1. The comparison may be made with respect to all points (pixels) within the range W1, and further, may be made with respect to several points or only one point within the range W1. By doing so, it is possible to shorten the time for the comparison processing.

Figure 6:
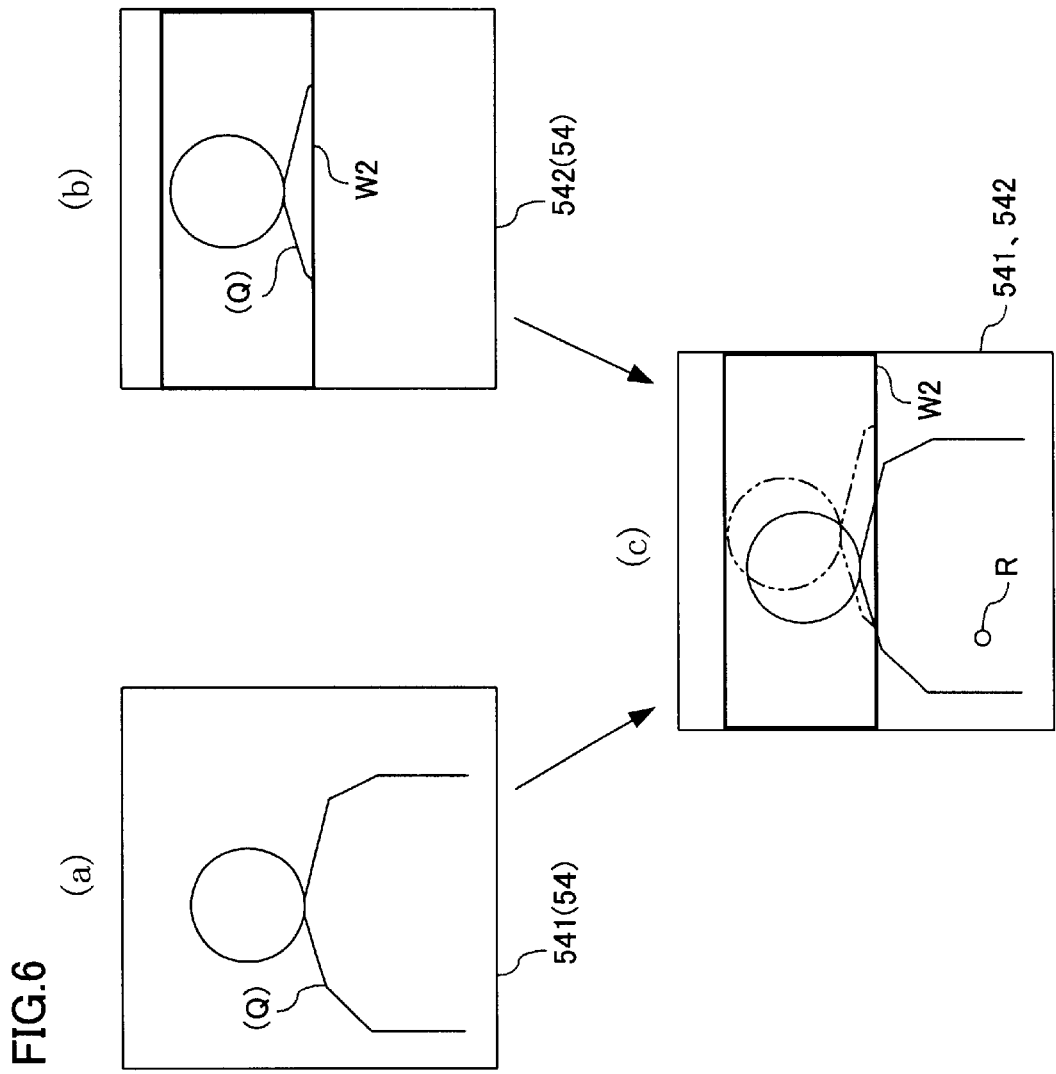
FIG. 6 is a view to explain the example of measuring a part of the object.

In the case where the comparison is made with respect to a part of the measuring range, any one of twice measurements may be carried out with respect to only a part used for the comparison. For example, as shown in (a) of FIG. 6, the first measurement is carried out with respect to the whole of the object Q, and then, as shown in (b) of FIG. 6, the second measurement is carried out with respect to a face range W2 of the object Q. Further, as shown in (c) of FIG. 6, a comparison is made with respect to only the range W2. Like the case of the range W1, the comparison may be made with respect to all points (pixels) within the range W2, and further, may be made with respect to several points or only one point within the range W2. By doing so, it is possible to further shorten the time for measurement and for the comparison processing.

Referring now to FIG. 2, in the case where a decision is made such that measurement is successful, the message display section 14 displays a message indicative of success, and displays a warning message indicative of retrying the measurement in the case where a decision is made such that measurement is unsuccessful.

The data storage section 15 stores any one or both of three-dimensional shape data DT1 and DT2 in the case where a decision is made such that measurement is successful. Even if a decision is made such that measurement is unsuccessful, there is the case where acquired data is usable; therefore, the difference ΔP and three-dimensional shape data DT1 and DT2 may be stored.

Next, the processing flow of the three-dimensional measuring system 1 of this first embodiment will be described below with reference to the flowchart.

Figure 7:
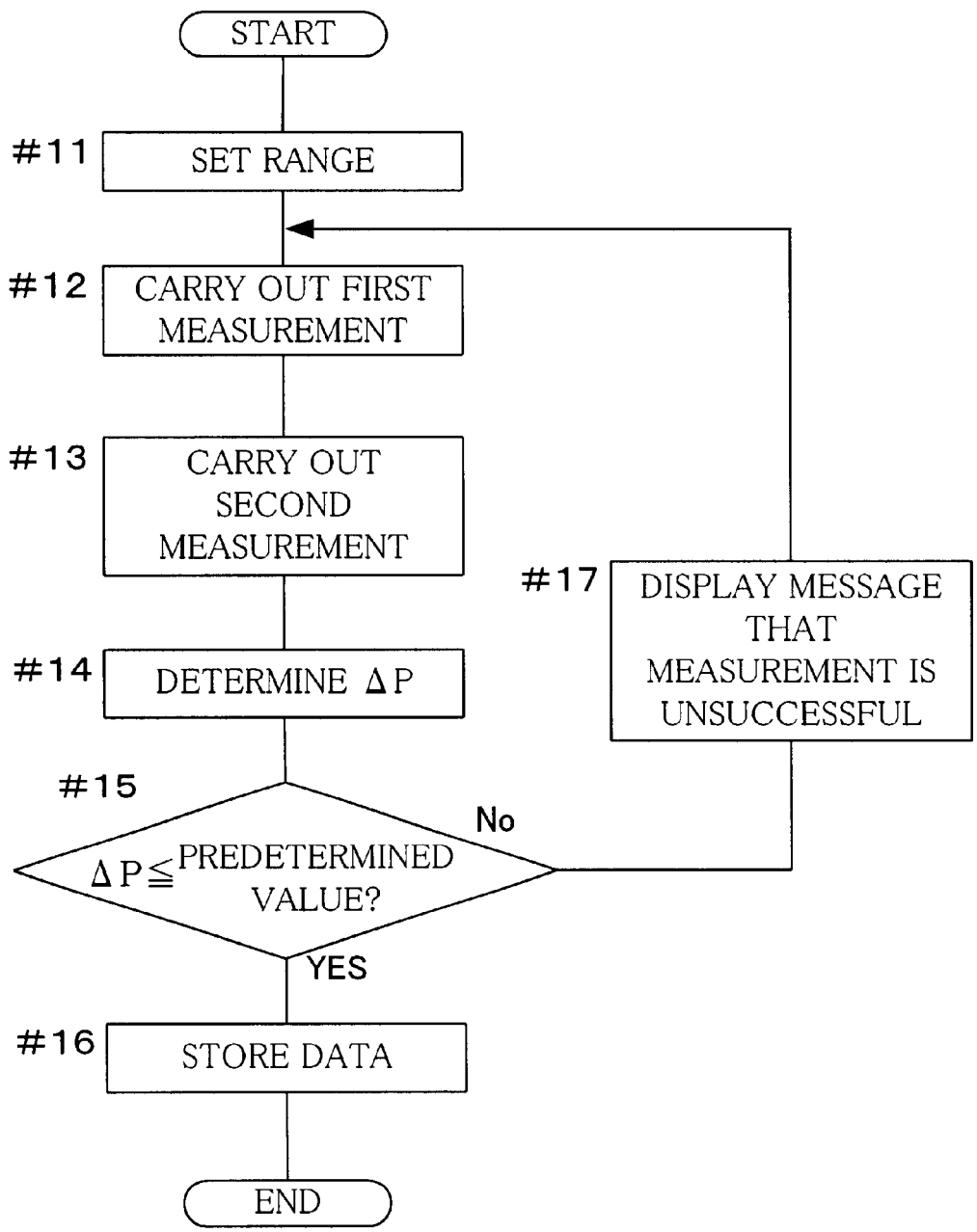
FIG. 7 is a flowchart to explain a process for the three-dimensional measuring system in the first embodiment.

As shown in FIG. 7, the computer (CPU) sets the range W1 used for the comparison between the difference ΔP and the predetermined value or the range W2 for carrying out measurement (step #11). The setup of the range W1 may be executed after step #13. In the case where measurement and comparison are carried out with respect to the whole of the object Q or the entire field, step #11 is omitted or the entire field range is set in step #11.

Twice measurements are carried out (steps #12 and #13), and then, a difference ΔP between the points P1 and P2 obtained by each measurement is determined(step #14). If the difference ΔP is smaller than a predetermined value (Yes in step #15), the data storage section 15 stores the three-dimensional shape data DT1 or DT2 obtained by the measurement (step #16). On the other hand, if the difference ΔP is larger than the predetermined value (No in step #15), the message display section 14 displays a message such that measurement is unsuccessful (step #17). If necessary, the processing returns to step #12, and then, measurement is retried.

According to this first embodiment, even if the object Q moves during measurement, the movement is detected, and the measurement can be retried; therefore, it is possible to acquire accurate three-dimensional shape data DT. Further, a value for making a comparison with the difference ΔP (predetermined value) is arbitrarily given; therefore, it is possible to acquire three-dimensional shape data DT while securing a required precision (accuracy).

In this first embodiment, the dispersion limit value ±ΔMAX of the 3D camera 2 has been used as the value for making a comparison with the difference ΔP (predetermined value). The predetermined value may be set to various values in accordance with the purpose of measurement. In addition, the value obtained by multiplying the dispersion limit value by a constant allowable value may be used.

Further, the distance image 54 has been used as information on a distance between the 3D camera 2 and each point on the object Q; however, other data may be used. For example, frame number data may be used. The frame number data is data, which is acquired before converted into a distance image, and corresponds to a distance between the 3D camera 2 and the object Q. The frame number data is used in "Vivid 700" which is mentioned in the above.

[Second embodiment]

Figure 8:
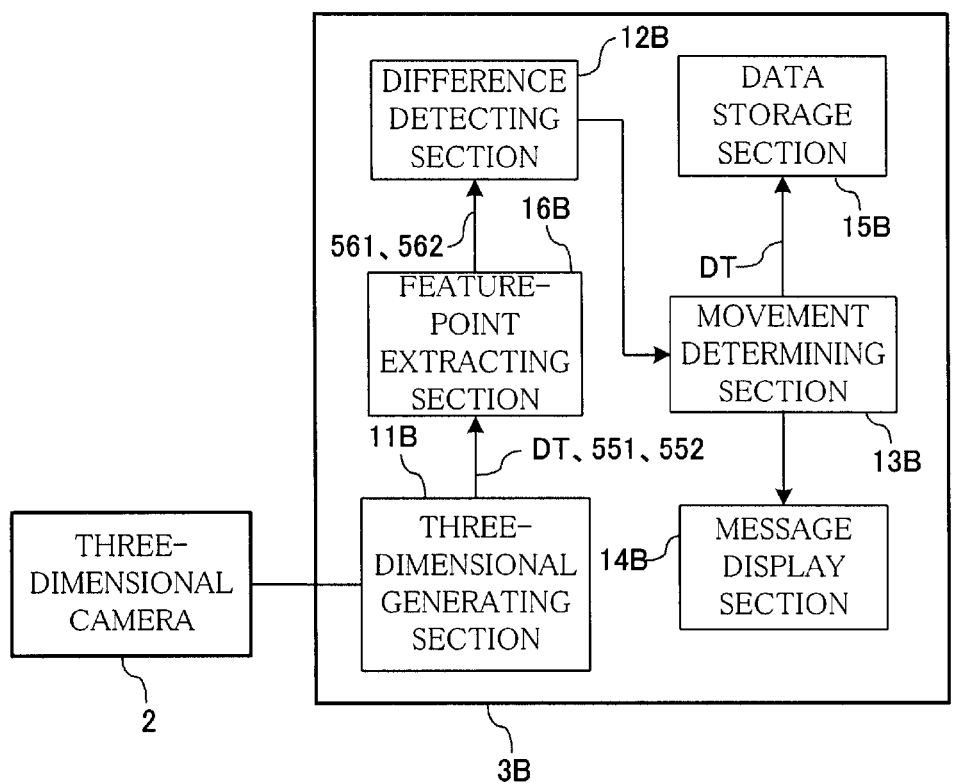
FIG. 8 is a view showing a functional configuration of computer according to a second embodiment of the present invention.
Figure 9:
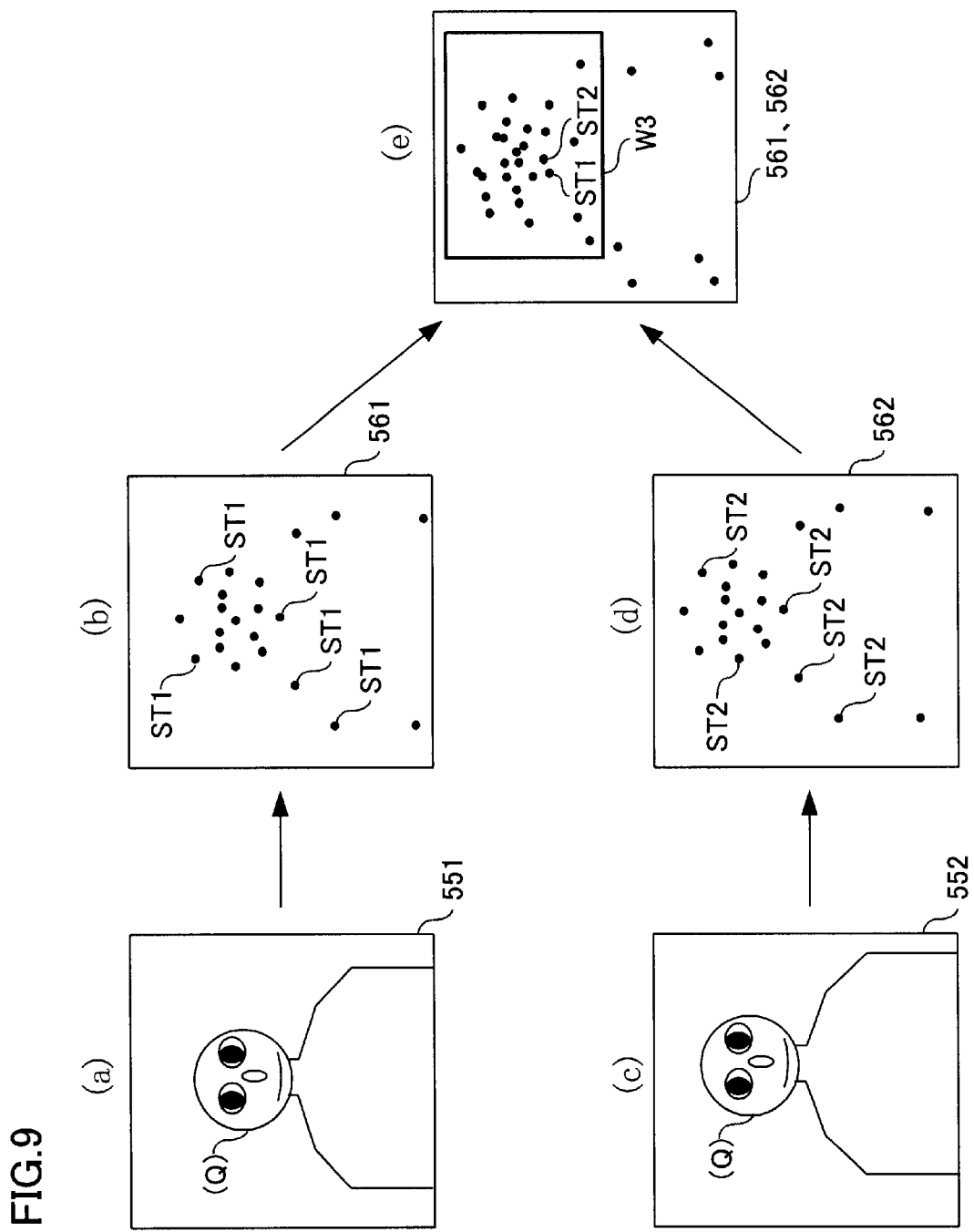
FIG. 9 is a view showing a two-dimensional image and a feature-point image.

FIG. 8 is a view showing a functional configuration of a computer 3B in a second embodiment, and FIG. 9 is a view showing two-dimensional images 551 and 552 and feature-point images 561 and 562.

In the above first embodiment, three-dimensional measurement has been carried out twice, and then, a movement during measurement has been detected based on the difference ΔP between the points P1 and P2 showing the three-dimensional position of the object Q. In this second embodiment, two pieces of ordinary two-dimensional image are acquired with respect to the object Q, and then, these two-dimensional images are compared, and thereafter, a movement is detected based on the difference between these two-dimensional images.

In this second embodiment, a three-dimensional measuring system having the same hardware configuration as the three-dimensional measuring system 1 shown in FIG. 1 is used. However, in this case, a method for detecting a movement is different; therefore, as shown in FIG. 8, the functional configuration of the computer 3B is different from that shown in FIG. 2.

More specifically, the computer 3B is functionally provided with a three-dimensional generating section 11B, a difference detecting section 12B, a movement determining section 13B, a message display section 14B, a data storage section 15B and a feature-point extracting section 16B. Further, three-dimensional measurement is performed twice using the 3D camera 2 in the first embodiment. In this second embodiment, three-dimensional measurement is carried out once, and then, the object Q is imaged at the time when the three-dimensional measurement starts and completes so as to acquire two pieces of two-dimensional image 551 and 552, which are color images.

The three-dimensional generating section 11B generates three-dimensional shape data DT of the object Q in the same manner as the three-dimensional generating section 11.

The feature-point extracting section 16B extracts a plurality of feature points ST1 and ST2 from the two-dimensional images 551 and 552 obtained by the 3D camera 2 so as to generate feature-point images 561 and 562, as shown in FIG. 9. For example, in the case where the object Q is human, tip of nose, tail of the eye, end of the eyebrow or corners of mouth is selected as the feature point ST.

The difference detecting section 12B compares the feature-point images 561 and 562 as shown in (e) of FIG. 9, and then, calculates a difference ΔST in position between the feature points ST1 and ST2. More specifically, when each position of the feature points ST1 and ST2 is set as (Xs1, Ys1) and (Xs2, Ys2), the difference ΔST is obtained from the following equation.

$$\Delta ST = |Xs1 - Xs2, Ys1 - Ys2|$$

The movement determining section 13B compares the difference ΔST and a predetermined value so as to detect the occurrence of a movement of the object Q during measurement, and then, makes a decision whether or not measurement is successful, in the same manner as the movement determining section 13 described before.

A pixel pitch ΔC=(ΔCx, ΔCy) of an image sensor for imaging the two-dimensional images 551 and 552 is used as a value for making a comparison with the difference ΔST (predetermined value). In this case, if any one of the conditions of |Xs1−Xs2|>ΔCx, or |Ys1−Ys2|>ΔCy is satisfied, a movement has occurred; therefore, a decision is made such that measurement is unsuccessful. On the other hand, if both conditions are not satisfied, no movement has occurred; therefore, a decision is made such that measurement is successful.

In accordance with the purpose of measurement, the value for making a comparison with the difference ΔST may be changed. For example, in the case of widening a movement allowable range, a value kΔC obtained by multiplying an allowable value k (in this case, k>1) may be used.

In this manner, the difference ΔST between the whole or partial feature points ST1 and ST2 of the two-dimensional images 551 and 552 is compared with the predetermined value, and a decision is made whether or not the measurement is successful. For example, as shown in (e) of FIG. 9, a comparison may be made with respect to a face range W3 of the object Q.

The message display section 14B displays a message as to whether measurement is successful or unsuccessful, in the same manner as the message display section 14 described before.

The data storage section 15B stores three-dimensional shape data DT in the case where a decision is made such that measurement is successful. Further, even if a decision is made such that measurement is unsuccessful, the data storage section 15B may store the difference ΔST and the three-dimensional shape data DT, like the first embodiment.

Next, the processing flow of the three-dimensional measuring system 1 of this second embodiment will be described below with reference to the flowchart.

Figure 10:
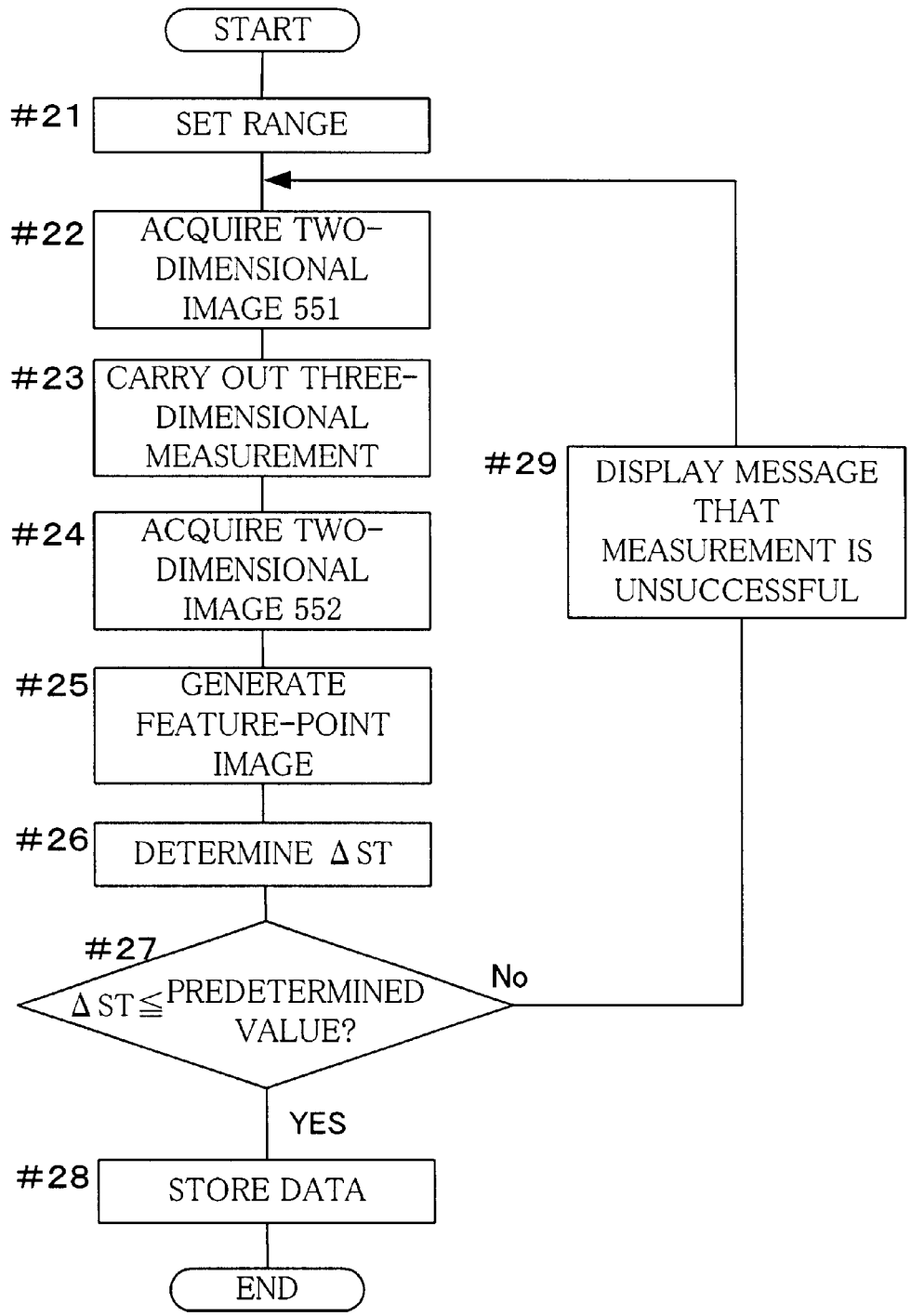
FIG. 10 is a flowchart to explain a process for the three-dimensional measuring system in the second embodiment.

As shown in FIG. 10, the computer 3B (CPU) sets the range W3 used for the comparison between the difference ΔST and the predetermined value (step #21). The setup of the range W3 may be executed after step #25. In the case where a comparison is carried out with respect to the entire measuring range, step #21 is omitted, or the entire field range is set in step #21.

The object Q is measured, and then, three-dimensional shape data DT is acquired (step #23). However, in this case, two-dimensional images 551 and 552 are acquired before and after measurement (steps #22 and #24). Feature-point images 561 and 562 are generated based on the two-dimensional images 551 and 552 (step #25), and then, the difference ΔST is determined (step #26).

If the difference ΔST is smaller than the predetermined value (Yes in step #27), the data storage section 15B stores the three-dimensional shape data DT obtained by the measurement (step #28). On the other hand, if the difference ΔST is larger than the predetermined value (No in step #27), the message display section 14B displays a message such that measurement is unsuccessful (step #29). If necessary, the processing returns to step #22, and then, measurement is retried.

According to this second embodiment, a movement of the object Q is detected based on the feature-point images 561 and 562, which are two-dimensional data; therefore, it is possible to shorten the time for the processing as compared with the above first embodiment. Further, in this second embodiment, the number of times of three-dimensional measurement is less than that in the first embodiment by one time; therefore, it is possible to further reduce the time for the whole processing.

In this second embodiment, the movement of the object Q has been detected using the feature points ST1 and ST2. A contour image of ears, a nose or a lip is generated from the two-dimensional images 551 and 552, and then, the contour thus generated is compared, thereby, a movement may be detected. The two-dimensional images 551 and 552 may be images capable of obtaining a luminance distribution. For example, these two-dimensional images may be monochrome images. Further, a movement may be detected using three or more pieces of two-dimensional image.

In the first and second embodiments described above, three-dimensional measurement or acquisition of two-dimensional image has been carried out twice. The three-dimensional measurement or acquisition of two-dimensional image may be carried out three times or more.

For example, in the case where three-dimensional measurement or pick-up of two-dimensional image is carried out three times, the presence of a movement of the object Q is detected twice using the data acquired by the first and second measurements and the data acquired by the second and third measurements. Then, the measurement result of detecting no movement may be employed. As described above, the number of times of three-dimensional measurement is increased, and thereby, it is possible to further improve a possibility of acquiring three-dimensional shape data DT having no error.

In the 3D camera 2, the distance image 54 has been used as information on the distance between the object Q and the 3D camera 2. In this case, time barycenter or space barycenter may be determined with respect to each pixel R of the light receiving surface of the charge coupled device.

The time barycenter is determined by the following method. More specifically, a reference beam is projected onto an object so as to scan the object, and then, the light receiving surface of the charge coupled device receives the reference beam reflected by the object. The value of the received light is arranged in the scanning sequence, and thereby, a discrete digital function is obtained. The digital function is converted to an analog function, and thereafter, the peak of the analog function is determined, and thereby, the time barycenter can be determined.

On the other hand, the space barycenter is determined by the following method. More specifically, like the case of the time barycenter, a reference beam is projected onto an object, and then, the light receiving surface of the charge coupled device receives the reflected reference beam. In this case, the reference beam reflected by the object is received by a plurality of continuous pixels on the light receiving surface. Then, the amount of light received by each pixel is determined, and these values are arranged, and thereby, a digital function, which is discrete at an interval of pixel pitch, is obtained. The digital function is converted to an analog function, and thereafter, the peak of the analog function is determined, and thereby, the space barycenter can be determined.

The method for calculating the three-dimensional position of the object using the time barycenter or the space barycenter has been already known. For example, the calculating method using the time barycenter has been disclosed in U.S. Pat. No. 6,297,881.

The time barycenter or the space barycenter is used, and thereby, it is possible to obtain the three-dimensional position of the object with precision finer than the pixel pitch.

In the first and second embodiments described above, the movement of the object Q has been detected based on the three-dimensional shape data DT or the two-dimensional data. The movement of the object Q may be detected by other methods.

For example, the three-dimensional measuring system 1 is provided with a distance measuring apparatus, which measures a distance of one point or several points on the object Q, as a distance measuring device. A distance to the object Q is measured by the distance measuring apparatus before and after three-dimensional measurement. Twice measurement results are compared, and then, if a change in distance is more than a predetermined value, a decision is made such that a movement occurs in the object Q. An active type distance measuring device for achieving focus of a camera may be used as the distance measuring device. Further, the pick-up optical system of the 3D camera is provided with a passive type focus detecting device so as to perform autofocus control, and the lens position of the optical system may be used as the distance information of the object.

The 3D camera disclosed in U.S. Pat. No. 6,297,881 using light-section method and "VIVID700" manufactured by Minolta Co., Ltd. have been taken as an example of the 3D camera. In this case, other type of 3D camera may be used. For example, various three-dimensional measuring methods such as pattern projection method or stereo method may be employed.

Besides, it is possible to properly change configuration, processing contents, processing sequence of the entire or each section of the three-dimensional measuring system 1, the 3D camera 2, and the computers 3 and 3B, a three-dimensional measuring method, and a movement detecting method within the scope of the present invention.

What is claimed is:

1. A three-dimensional measuring system comprising:
    a measuring device for measuring a three-dimensional shape of an object;
    a movement detecting device for making a detection whether or not an object to be measured moves during measurement; and
    an output device for outputting a signal when a detection is made such that the object to be measured moves, the signal indicating the detection of the movement
    wherein:
    the movement detecting device makes a detection whether or not the object to be measured moves based on plural-time measurement results, the system further includes a distance measuring device for measuring a distance to the object to be measured, independently from the measuring device that measures a three-dimensional shape of the object, and the movement detecting device makes a detection whether or not the object to be measured moves based on an output of the distance measuring device before and after measurement.

2. The three-dimensional measuring system according to claim 1, wherein the system further includes a pick-up device for imaging a two-dimensional image of the object to be measured, and the movement detecting device makes a detection whether or not the object to be measured moves based on an output of the pick-up device before and after measurement.

3. A three-dimensional measuring method comprising the steps of:

carrying out plural-time measurements with respect to a point on an object along the same line of vision using a three-dimensional measuring device;

acquiring distance information on a distance between the point on the object and the three-dimensional measuring device for each measurement;

determining a difference of the distance information of each point; and making a decision such that the measurement is successful when the difference is smaller than a predetermined value while making a decision such that the measurement is unsuccessful when the difference is larger than the predetermined value.

4. The three-dimensional measuring method according to claim 3, wherein any one of plural-time measurement results is employed as a three-dimensional shape of the object in the case where a decision is made such that the measurement is successful.

5. The three-dimensional measuring method according to claim 3, wherein the difference is determined with respect to only depth direction of a measuring range of the three-dimensional measuring device, and a decision is made whether measurement is successful or unsuccessful according to a relation between the difference and the predetermined value.

6. A three-dimensional measuring method comprising the steps of:

measuring a three-dimensional shape of an object;

acquiring a plurality of two-dimensional images with respect to the object when starting or completing the measurement or during the measurement;

determining a difference between the acquired two-dimensional images; and making a decision such that the measurement is successful when the difference is smaller than a predetermined value while making a decision such that the measurement is unsuccessful when the difference is larger than the predetermined value.

7. The three-dimensional measuring method according to claim 6, wherein a point or line expressing features of the object is extracted from the two-dimensional image, and the difference is determined based on the extracted point or line.

8. A three-dimensional measuring system comprising:

a three-dimensional measuring device for measuring a three-dimensional shape of an object;

a distance information acquiring device for acquiring distance information on a distance between a point on the object and the three-dimensional measuring device for each measurement by the three-dimensional measuring device;

a difference detecting device for detecting a difference of the distance information with respect to the point on the object along the same line of vision in the measurement by the three-dimensional measuring device; and a determining device for comparing the difference with a predetermined value, and for making a decision whether measurement is successful or unsuccessful.

9. A three-dimensional measuring system comprising:

a three-dimensional measuring device for measuring a three-dimensional shape of an object;

an image acquiring device for acquiring a plurality of two-dimensional images with respect to the object when starting or completing measurement or during the measurement;

a difference detecting device for detecting a difference between the acquired two-dimensional images; and a determining device for comparing the difference with a predetermined value, and for making a decision whether measurement is successful or unsuccessful.

* * * * *